(12) United States Patent
Wang

(10) Patent No.: US 9,276,755 B2
(45) Date of Patent: Mar. 1, 2016

(54) CHANNEL OCCUPANCY EFFICIENT, LOW POWER WIRELESS NETWORKING

(71) Applicant: QUALCOMM Incorporated, San Diego, CA (US)

(72) Inventor: Long Wang, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 14/055,839

(22) Filed: Oct. 16, 2013

(65) Prior Publication Data

US 2014/0044031 A1   Feb. 13, 2014

Related U.S. Application Data

(62) Division of application No. 13/326,287, filed on Dec. 14, 2011, now Pat. No. 8,582,496, which is a division of application No. 11/775,835, filed on Jul. 10, 2007, now Pat. No. 8,098,614.

(60) Provisional application No. 60/807,042, filed on Jul. 11, 2006.

(51) Int. Cl.
*H04L 12/12* (2006.01)
*H04W 52/02* (2009.01)
*H04W 74/06* (2009.01)
*H04W 56/00* (2009.01)
*H04W 76/04* (2009.01)

(52) U.S. Cl.
CPC ........... *H04L 12/12* (2013.01); *H04W 52/0203* (2013.01); *H04W 74/06* (2013.01); *H04W 56/001* (2013.01); *H04W 76/048* (2013.01); *Y02B 60/50* (2013.01)

(58) Field of Classification Search
CPC ..... H04W 84/12; H04W 84/18; H04W 48/16; H04W 48/08; H04W 52/0216; H04W 8/005
See application file for complete search history.

(56) References Cited

U.S. PATENT DOCUMENTS

| | | | |
|---|---|---|---|
| 7,656,831 | B2 | 2/2010 | Gao et al. |
| 7,801,574 | B2 | 9/2010 | Ueda et al. |
| 8,098,614 | B1 | 1/2012 | Wang |
| 2005/0136913 | A1 | 6/2005 | Kampen et al. |
| 2006/0193296 | A1 | 8/2006 | Zhong et al. |
| 2006/0285527 | A1 | 12/2006 | Gao et al. |
| 2007/0201413 | A1 | 8/2007 | Laine et al. |
| 2007/0242634 | A1 | 10/2007 | Calcev et al. |
| 2008/0045159 | A1 | 2/2008 | Mashimo et al. |
| 2012/0087288 | A1 | 4/2012 | Wang |

OTHER PUBLICATIONS

Publication entitled: "A High Throughput and Low Power Ad-hoc Wireless LAN Protocol", Khanna et al., Published online: Jun. 9, 2006, Springer Science + Business Media, LLC 2006; 16 pages.

*Primary Examiner* — Nam Huynh
(74) *Attorney, Agent, or Firm* — Holland & Hart LLP

(57) ABSTRACT

An apparatus and method are provided for efficiently sharing a single wireless channel and for providing improved power saving. Automatic beacon "sliding" establishes a round-robin contention-free channel schedule among multiple IBSSs. Entering an idle state immediately following communication after a beacon saves power. Further power savings occur when presumptions of pending traffic may be made.

18 Claims, 6 Drawing Sheets

CHANNEL OCCUPANCY EFFICIENT, LOW POWER WIRELESS NETWORKING

RELATED APPLICATIONS

This application is a divisional of U.S. application Ser. No. 13/326,287, entitled "Channel-Occupancy Efficient, Low Power Wireless Networking" filed Dec. 14, 2011, which is a divisional of U.S. application Ser. No. 11/775,835, entitled "Channel-Occupancy Efficient, Low Power Wireless Networking" filed Jul. 10, 2007 which claims priority of U.S. Provisional Patent Application 60/807,042, entitled "Channel-Occupancy Efficient, Low-Power Wireless Networking" filed Jul. 11, 2006.

BACKGROUND OF THE INVENTION

1. Field of the Invention

The present invention relates to efficient channel occupancy and power saving techniques in wireless networks. More particularly, the invention relates to media access control (MAC) behavior in wireless networks that promotes channel sharing and a greater aggregate idle (as opposed to wake or transmit) time among stations.

2. Related Art

The IEEE 802.11-1999 wireless networking standard provides for operation of a plurality of ad-hoc networks (each network forming an independent basic service set or IBSS) on a single channel. Each IBSS will send high-priority beacon signals in contention with other IBSS beacon signals. Information traffic, which is of lesser priority than beacon signals, then contends for the channel when beacon signals are not present. As traffic becomes denser, more collisions typically occur, thereby requiring contention resolution in the form of random backoff.

The IEEE 802.11-1999 wireless networking standard (§11.2.2 of that standard) provides for an ad-hoc power-saving mode. This power-saving mode calls for each station in the ad-hoc network to listen at beacon time for an indication that traffic for that station is pending. These indications are provided in the form of announcement traffic indication message (ATIM) packets. Stations with pending traffic must remain in the "wake" state until the next target beacon transmission time (TBTT) occurs without an ATIM packet for that station. This wake state undesirably uses more power than an "idle" state.

Wireless networking is being adapted to new applications, such as handheld interactive video games and voice over Internet Protocol (VoIP), both of which have well-characterized and regularly occurring data transmissions. For example, a video game may want to update its status relative to other players at approximately a 60 Hz rate. An exemplary update rate for VoIP could be approximately 33-50 packets per second. Jitter, which results from packet collision, contention, and resolution, may interfere with smooth game play or voice communication. Therefore, a need arises for channel access that will promote contention avoidance.

Moreover, power savings are desirable for many wireless applications. For example, handheld interactive video games are commonly powered by batteries. Therefore, a further need arises for improving power saving in wireless ad-hoc networks carrying relatively dense and well-characterized traffic.

SUMMARY OF THE INVENTION

Methods for providing access to a wireless channel advantageously promote both contention avoidance and power savings. In accordance with one aspect of the invention, a station can enter an idle (i.e. low power) state after the station has completed its data packet transactions and reception, but earlier than waiting for the next TBTT and ATIM window. Specifically, using a MORE DATA bit in the frame control field in a non-802.11 way can indicate traffic completion.

In one embodiment, a packet with its MORE DATA bit set to "1" indicates that the receiving station should remain in a wake state because at least one more packet for that station is pending. In contrast, a packet with its MORE DATA bit set to "0" (referenced herein as a NULL packet) indicates that the station can enter an idle state until the next beacon time, assuming that the station is not receiving unicast packets or transmitting any packets. In one embodiment, a small delay (relative to the beacon interval) occurs before transmission of the NULL packet to allow for queuing delays from a higher-level networking layer to a lower-level transmission queue. This delay can be set by a NULL timer in the station. If the NULL timer has not expired, then the station can continue to receive and/or transmit packets.

In accordance with another aspect of the invention, a self-selected "master" station of an IBSS can enter the idle state after the master has received a reply from all other stations ("clients") in the IBSS. In this case, the ATIM window can be set to zero and communication between all clients and the master is assumed. This configuration is advantageous in applications such as game control traffic where each beacon interval is known to involve status transfer from the master to all stations and vice versa. In this way, no traffic is wasted sending notifications or waiting for the ATIM window to expire.

In accordance with yet another aspect of the invention, multiple masters (each master controlling an IBSS on one channel) may cause their respective beacon timings to shift to non-contending times by setting beacon transmission to a priority below that of data traffic (normally, beacon transmission has a higher priority than data traffic). In this manner, each IBSS beacon will be followed by a burst of data traffic, wherein the data traffic forces other IBSS masters to wait until the data traffic completes before sending their beacons. Multiple IBSSs will therefore "slide" their beacons and data bursts to a temporally unoccupied portion of a channel, thereby establishing a round-robin access pattern between the IBSSs with minimal contention. In one embodiment, to provide this sliding, the priority of a beacon packet can be less than a priority of at least one of DIFS packets and EIFS packets. In this case, the beacon refresh period for each IBSS can be set to at least a sum of data burst lengths for all IBSSs. The DIFS packets can include at least one of data packets and management packets.

DETAILED DESCRIPTION OF THE FIGURES

Figure 1:
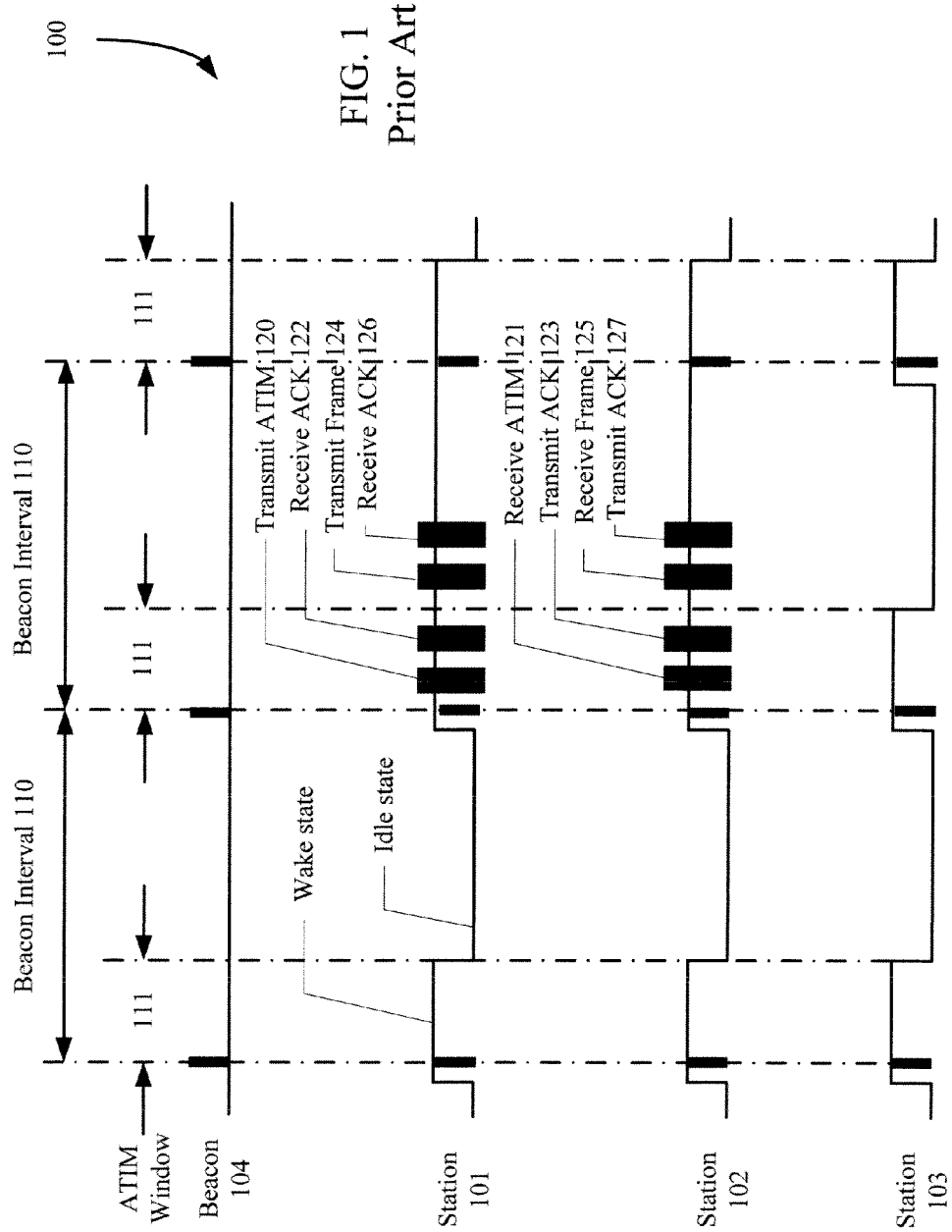
FIG. 1 illustrates a prior art ad-hoc power saving procedure prescribed by the IEEE-802.11-1999 wireless networking standard.

Various techniques can be used to reduce power consumption and contention in wireless networking devices. For example, FIG. 1 illustrates an ad-hoc power saving technique 100 prescribed by the IEEE-802.11-1999 wireless networking standard. In technique 100, a beacon 104 is followed by an announcement traffic indication message (ATIM) window 111 (first, second, and third ATIM windows 111 shown), where the period of ATIM window 111 is specified by beacon 104.

Notably, any station having data to transmit sends its ATIM within ATIM window 111, although the timing of each ATIM transmission is arbitrary. In FIG. 1, only station 101 has pending data to send to station 102, as indicated within the second ATIM window 111 for those stations.

Specifically, station 101 transmits its ATIM (Transmit ATIM 120) and station 102 receives that ATIM (Receive ATIM 121) within the second ATIM window 111. Station 102 then transmits an acknowledgement (ACK) signal of that received ATIM (Transmit ACK 123) and station 101 receives that ACK signal (Receive ACK signal 122). Note that Transmit ACK 123 and Receive ACK 122 could be transmitted and received, respectively, outside ATIM window 111. At this point, station 101 can transmit a data frame (Transmit Frame 124) and station 102 can receive that data frame (Receive Frame 125). After receipt of the data frame, station 102 can transmit an ACK signal (Transmit ACK 127) and station 101 can receive that ACK signal (Receive ACK 126).

Notably, stations 101 and 102 stay in a wake state until the end of the next (i.e. third) ATIM window 111 even though they have finished transmitting and receiving packets. In contrast, because station 103 is not receiving or transmitting packets within the second ATIM window 111, station 103 enters an idle (i.e. low power) state as soon as the second ATIM window 111 concludes. Therefore, stations (e.g. stations 101 and 102) that complete their communication well before the end of a beacon interval 110 continue to use significant power in the wake state compared to stations in the idle state (e.g. station 103).

Figure 2A:
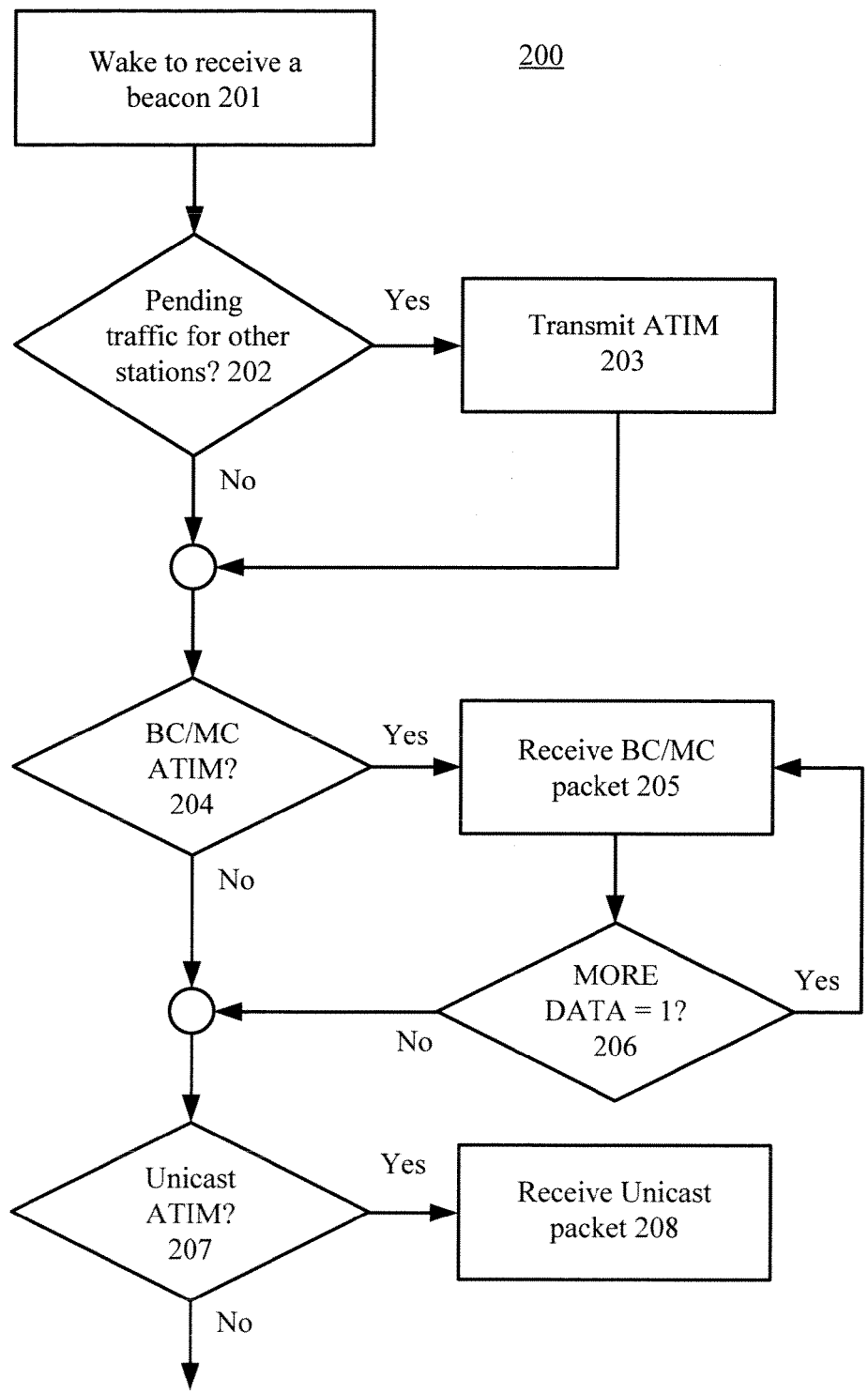
FIG. 2A illustrates a technique including a non-standard use of a MORE DATA bit. This non-standard use allows a station to remain in a wake state to receive packets and, optionally, to transmit packets to another station.
Figure 2B:
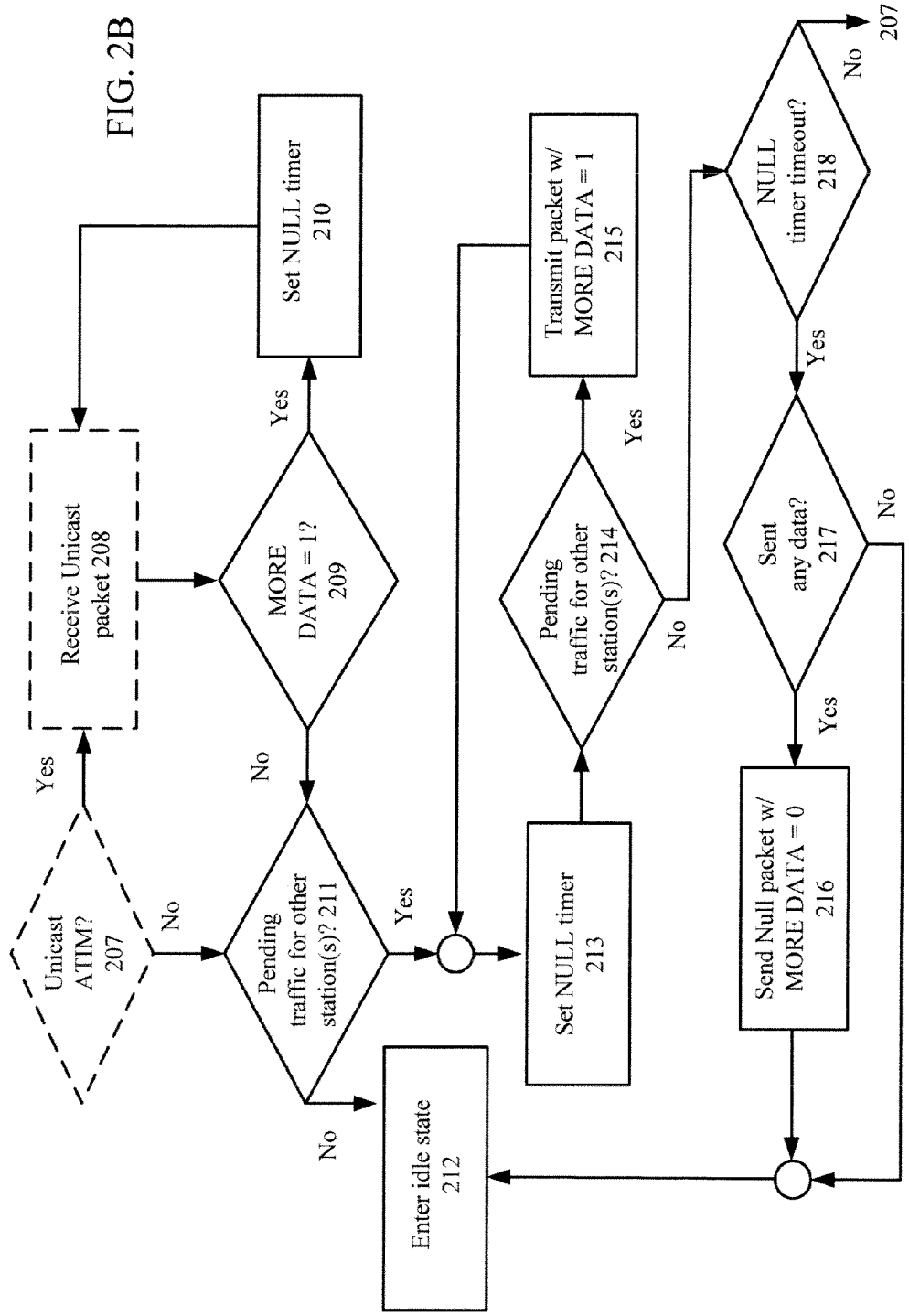
FIG. 2B illustrates additional steps in the technique of FIG. 2A in which a Null timer can be used in combination with the MORE DATA bit. This Null timer can immediately put the station in a power-saving idle state when reception, transmission, and a small delay time have completed.

FIGS. 2A and 2B illustrate a technique 200 that provides enhanced power saving for stations in an ad-hoc wireless network. To provide this power saving, technique 200 uses a MORE DATA bit in a non-802.11 way. The MORE DATA bit, which is provided in a MAC frame format, is typically used to designate segmentation. Specifically, the MORE DATA bit would indicate whether a single, extremely large frame from an access point (AP) has been broken up into multiple, smaller frames that are being buffered by that AP. In this conventional use, a value of "1" indicates that at least one additional buffered frame will be sent from the AP to the receiving station.

In accordance with one aspect of the invention, the MORE DATA bit is set to either "1" (which indicates that the receiving station should remain in a wake state because at least one more packet for that station is pending) or "0" (which indicates that this packet includes no data and no further data packets will be sent, thereby providing a potential advantage by allowing the station to enter an idle state before a next beacon). As explained below, this MORE DATA bit can be advantageously used in transmitting broadcast, multicast, and/or unicast packets.

In step 201, a station wakes to receive one or more beacons. Step 202 determines whether that station has pending traffic for one or more stations in that network. If so, then step 203 transmits an ATIM to those stations. An ATIM can be a broadcast ATIM, a multicast ATIM, or a unicast ATIM, wherein each ATIM designates its intended receiving stations.

Following transmission of the ATIM or assuming that the station has no pending traffic for another station, step 204 determines whether any broadcast (BC) ATIM or multicast (MC) ATIM designates that station. If so, then step 205 receives the corresponding BC/MC packet. At this point, step 206 determines whether the MORE DATA bit of the BC/MC packet is set to "1", thereby indicating that at least one more packet for that station is pending. If so, then technique 200 returns to step 205 to receive another BC/MC packet.

If no BC/MC packet is being transmitted (step 204) or if the MORE bit is not set to 1 (step 206) (i.e. the MORE bit is set to 0, thereby indicating that that this packet includes no data and no further BC/MC packets will be sent), then step 207 determines whether a unicast ATIM designating that station was sent. If so, then step 208 receives that unicast packet. Note that, in this embodiment, broadcast and multicast packets are given higher priority than unicast packets because broadcast and multicast packets affect more stations and typically involve important functions.

After receiving a unicast packet, step 209 determines whether the MORE DATA bit is set to 1, thereby indicating that at least one more unicast packet for that station is pending. If so, then step 210 sets a NULL timer in the station and the station returns to step 208 to receive another unicast packet. Note that if multiple unicast packets for that station are pending, then each traversal of step 210 resets the NULL timer.

If no unicast packet is pending for that station (step 207) or if the MORE DATA bit is not set to 1 (step 209) (i.e. is set to 0), then step 211 determines whether that station has any pending traffic for another station (or a set of stations using broadcast or multicast packets). If so, then step 213 sets the NULL timer. Step 214 determines whether at least one more packet for the destination station(s) is pending. If so, then step 215 transmits a packet with its MORE DATA bit set to 1. Then, technique 200 returns to step 213 to reset the NULL timer.

If another packet for another station is not pending (step 214), then step 218 determines whether a timeout of the NULL timer has occurred. If so, then step 217 determines whether the station sent any data. If so, then the station sends a NULL packet, i.e. a packet with its MORE bit set to "0". This NULL packet indicates to the current receiving station(s) that the current packet includes no data and no further packets with data from the transmitting station will be sent in this beacon interval. Therefore, the NULL packet in combination with the MORE DATA bit set to 0 can advantageously indicate that other stations can enter an idle state (assuming the other conditions discussed above are met). If no traffic for other station(s) is pending (step 211) or after sending the null packet (step 216), then step 212 enters an idle state. Note that if the null timer has not timed out (step 218), then technique 200 returns to step 207 to determine whether any other unicast packet for that station is pending.

Technique 200 advantageously provides power savings based on the following flow summary.

(1) A station will enter the wake state to receive a beacon signal.
(2) Following that beacon, a station will send any ATIM transmissions.
(3) A station, upon receiving an ATIM indicating broadcast or multicast traffic, will receive such traffic until a packet with the MORE bit is set to 0 (clear or cleared).
If no unicast ATIM indicating packets queued for this station has been received and no ATIM was transmitted from this station, then the station can immediately enter an idle state.
(4) If a unicast ATIM for this station was received or if an ATIM was transmitted from this station, then the station can receive and/or transmit data (in one embodiment, receiving packets (if any) first and then transmitting packets (if any)). As long as packets are being received or transmitted with the MORE DATA bit being set to 1, a NULL packet timer is being set to a predetermined delay value. After a NULL packet has been received or transmitted by the station, thereby indicating that no additional queued packets are pending (for either receipt or transmission), the station returns to the power save idle state.

In one embodiment, the predetermined delay value is approximately 10 ms. This delay advantageously keeps the station in the wake state even if a higher data transmission protocol layer cannot fill the packet transmission queue quickly enough to prevent the queue from appearing empty and causing the transmission of the NULL packet with the MORE DATA bit cleared prematurely. This delay value can be tuned for particular applications.

In some embodiments, a station receiving packets may immediately send packets back to the originating station without intervening signals. Note that this immediate transmission is in contrast with the practice of the IEEE-802.11-1999 wireless networking standard, which would normally require a response to be sent after another beacon and the transmission of an ATIM by the responding recipient. This immediate transmission and the predetermined delay provided by the NULL timer permit throughput substantially similar to that of the IEEE-802.11-1999 wireless networking standard without requiring a station to remain in the wake state for the duration of the target beacon transmission time (TBTT).

Figure 3:
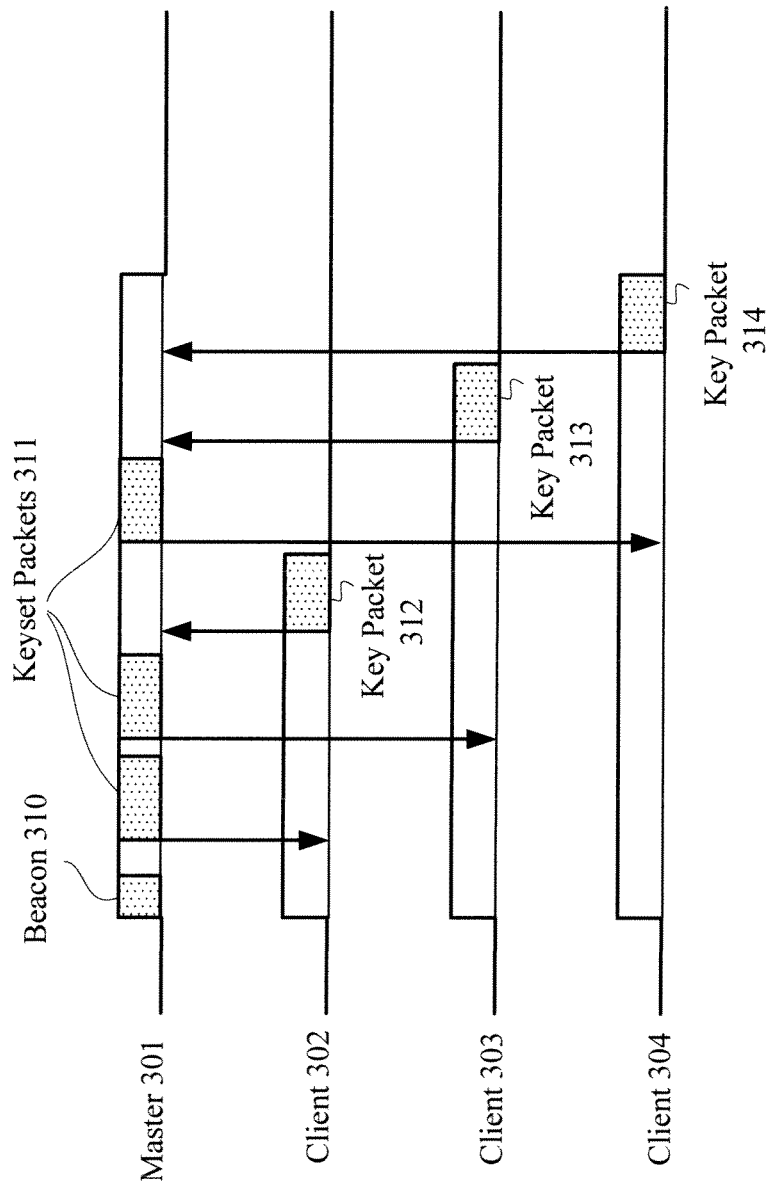
FIG. 3 illustrates a power saving technique in which each client station can enter an idle state after it receives traffic from and provides traffic to a master station. The master station can enter an idle state after it has received traffic from all the client stations.

FIG. 3 illustrates an IBSS in which one station is self-designated a master station ("master") 301 and multiple client stations ("clients") want to receive data from and send data to the master in each beacon period. When master 301 wakes to send a beacon 310, clients 302, 303, and 304 enter the wake state to hear the beacon. At this point, master 301 can send data, i.e. keyset packets 311, to clients 302, 303, and 304 (shown by down arrows). A keyset packet 311 includes aggregated, updated data from all clients. To ensure that all clients receive the keyset packet 311, master 301 sends a unicast packet to each client (note that transmitting a multicast packet would not necessitate a corresponding ACK packet that acknowledges receipt of the keyset packet).

Once clients receive their keyset packets 311, each client can respond to master 301 with its corresponding key packet (i.e. updated data from that station)(shown by up arrows) based on wireless medium availability. That is, each client contends with the other clients as well as master 301 for the wireless medium. For example, after receiving its keyset packet 311, client 302 must wait for an open period on the wireless medium to send its corresponding key packet 312 to master 301. In this case, the first opportunity for this transmission is after master 301 sends a keyset packet 311 to client 303. Note that because client 303 has also received its keyset packet 311 by this time, clients 302 and 303 would both be vying to send their key packets back to master 301. In this case, client 302 "beat" client 303 in sending its key packet back to master 301. Therefore, client 303 waits until the next open period on the wireless medium to send its key packet 313 to master 301. Once again, because both clients 303 and 304 have received their keyset packets 311 by that time, clients 303 and 304 would be vying to send their key packets back to master 301. In this case, client 303 "beat" client 304 in sending its key packet back to master 301.

As shown in FIG. 3, after concluding reception and transmission, each client can immediately enter an idle state until it wakes to listen for the next beacon (not shown). After clients 301, 302, and 303 have concluded their receptions and transmissions, master 301 can enter the idle state.

Notably, FIG. 3 illustrates an ATIM-less process in which each client is presumed to want to receive data from and send data to the master in each beacon period. This presumption advantageously saves transmit power that would otherwise be expended communicating the obvious, i.e. packets are to be transmitted by each station (both master and clients) each beacon period. Note that the transmit state consumes significantly more power than the wake state. Therefore, an ATIM-less process can save significant power.

In one embodiment, the stations can still send ATIMs, wherein each client can enter the idle state after that client concludes its transactions with the master. In this case, even without an ATIM presumption, each client can still enter the idle state earlier than prescribed in the IEEE-802.11-1999 wireless networking standard, thereby still saving power.

Figure 4:
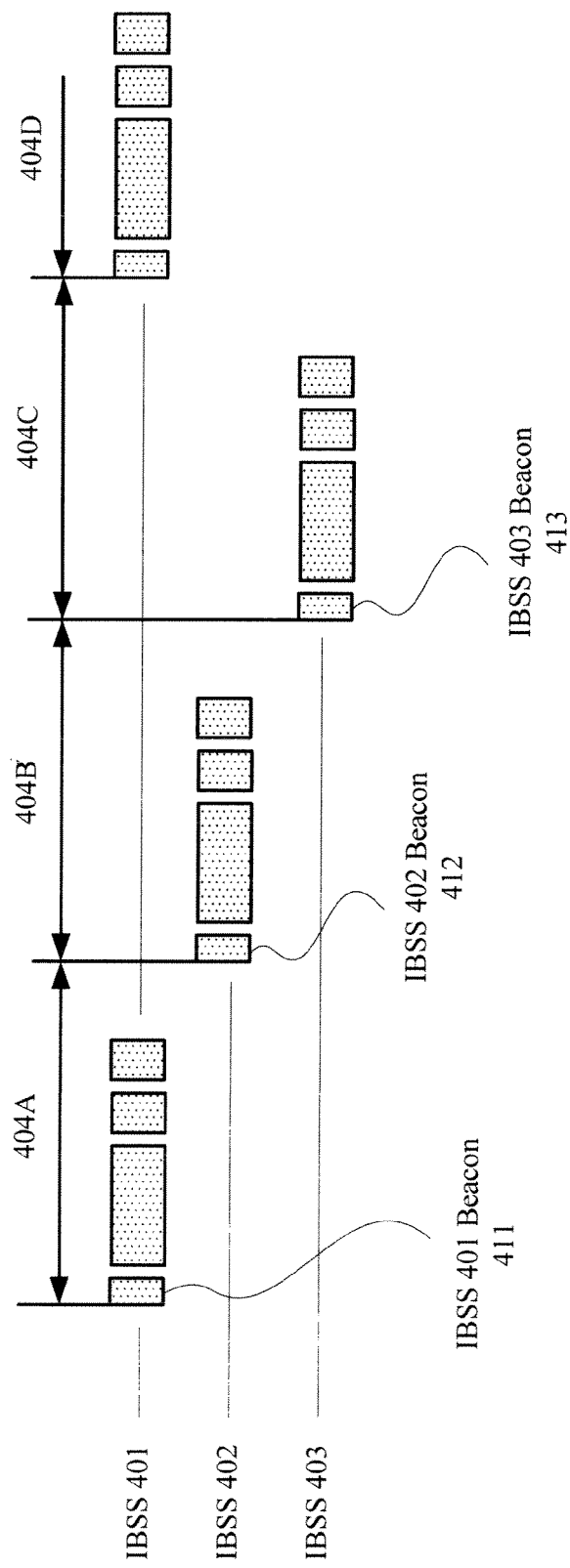
FIG. 4 illustrates the traffic of multiple groups of stations after settling into a contention-free timing pattern.

FIG. 4 depicts IBSSs 401, 402, and 403 after having reached a steady-state round-robin distribution of their transmission times on a shared channel. This steady state can be established by setting the priority of beacons below that of other packets (note that beacons typically have highest priority). As explained below, beacons from other IBSSs will be forced to wait for the completion of a data burst associated with one IBSS before the next beacon can be sent.

Figure 5:
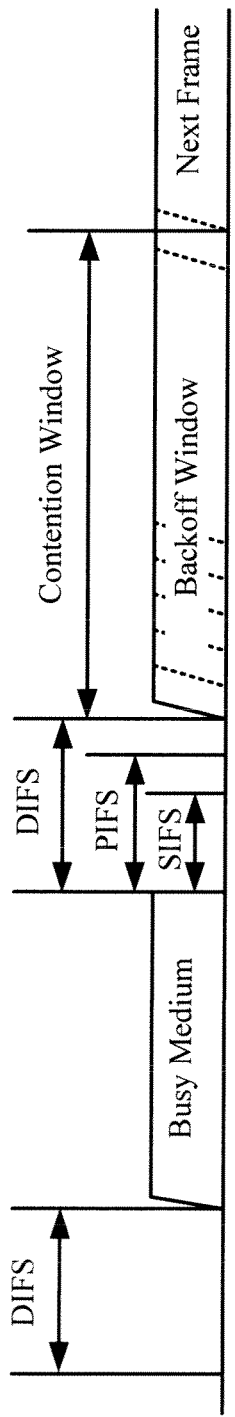
FIG. 5 illustrates various types of AIFS period, e.g. a distributed inter-frame space (DIFS).

In one embodiment, a beacon can be set to use an arbitration inter-frame space (AIFS) (i.e. a predetermined space between frames) of 5 with a contention window (CWIN) size of 7 relative to data with an AIFS of 1 and a CWIN size of 3. The IEEE-802.11-1999 standard defines, in §9.2.3, several types of AIFS periods, including a distributed interframe space (DIFS) (shown in FIG. 5 for reference purposes) and an extended interframe space (EIFS). The DIFS (DCF interframe space) is used by stations operating under the DCF to transmit data frames and management frames. The EIFS (extended interframe space) is used by the DCF whenever the PHY has indicated to the MAC that a frame transmission that started did not result in a correct reception.

In one embodiment, beacons from each IBSS will be forced to "slide" into a distinct position relative to the other IBSSs, thereby establishing a steady-state round-robin temporal distribution that minimizes collisions between the IBSSs. For example, a station in IBSS 401 can transmit its beacon 411 during beacon interval 404A (note that only one station in an IBSS generally transmits beacons), a station in IBSS 402 can transmit its beacon 412 during beacon interval 404B, and a station in IBSS 402 can transmit its beacon 413 during beacon interval 404C.

After IBSSs 401, 402, and 403 have used their respective beacon intervals 404A, 404B, and 404C for transmission (e.g. for beacons, ATIMs, data frames, ACKs, etc.), the beacon-generating station in IBSS 401 can once again transmit its beacon during beacon interval 404D (partially shown). IBSSs 402 and 403 can follow the established priority pattern. This round-robin arrangement can be established by setting an appropriate beacon refresh period for each IBSS that is equal to at least the aggregate of the beacon intervals for all IBSSs. For example, if each beacon interval 404A, 404B, and 404C is 5 msec, then the beacon refresh period for each IBSS is at least 15 msec. Notably, this arrangement works well so long as the data burst length is less than TBTT/N, wherein there are N IBSSs active on one channel.

In another embodiment, the priority of a beacon packet can be less than a priority of at least one of DIFS packets and EIFS packets. In this case, the beacon refresh period for each IBSS can be set to at least a sum of data burst lengths for all IBSSs. As noted above, the DIFS packets can include at least one of data packets and management packets.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. For example, although the use of beacons is described herein, other types of coordination transmissions, e.g. a contention-free poll (CF-Poll) packet can be used in the present invention. Accordingly, it is intended that the scope of the invention be defined by the following Claims and their equivalents.

The invention claimed is:

1. A method of reducing contention between independent basic service sets (IBSSs), the method comprising:
    setting, by at least one station, a priority of a beacon packet less than a priority of (a) at least one of DCF interframe space (DIFS) packets and extended interframe space (EIFS) packets, or (b) any other type of packet; and
    setting a beacon refresh period for each IBSS equal to at least a sum of beacon intervals for all IBSSs for (a), or a sum of data burst lengths for all IBSSs for (b).

2. The method of claim 1, wherein one other type of packet includes a data burst.

3. The method of claim 2, wherein a length of the data burst is less than a target beacon transmission time (TBTT)/N, and wherein N is a number of the IBSSs active on one channel.

4. The method of claim 1, further including setting an arbitration inter-frame space (AIFS) and a contention window (CWIN) of the beacon packet.

5. The method of claim 4, wherein the AIFS=5 and the CWIN=7 relative to a data packet having its AIFS=1 and its CWIN=3.

6. The method of claim 1, wherein the DIFS packets include at least one of data packets and management packets.

7. A system configured to reduce contention between independent basic service sets (IBSSs), the system using a technique comprising:
    setting a priority of a beacon packet less than a priority of (a) at least one of DCF interframe space (DIFS) packets and extended interframe space (EIFS) packets, or (b) any other type of packet; and
    setting a beacon refresh period for each IBSS equal to a sum of data burst lengths for all IBSSs for (a), or at least a sum of beacon intervals for all IBSSs for (b),
    wherein the system includes a plurality of stations, each IBSS including at least one station.

8. The system of claim 7, wherein one other type of packet includes a data burst.

9. The system of claim 8, wherein a length of the data burst is less than a target beacon transmission time (TBTT)/N, and wherein N is a number of the IBSSs active on one channel.

10. The system of claim 8, further including setting an arbitration inter-frame space (AIFS) and a contention window (CWIN) of the beacon packet.

11. The system of claim 9, wherein the AIFS=5 and the CWIN=7 relative to a data packet having its AIFS=1 and its CWIN=3.

12. The system of claim 7, wherein the DIFS packets include at least one of data packets and management packets.

13. A method of reducing contention between independent basic service sets (IBSSs), the method comprising:
    setting, by at least one station, a priority of a coordination transmission packet less than a priority of (a) a data transmission packet, or (b) at least one of DCF interframe space (DIFS) packets and extended interframe space (EIFS) packets; and
    setting a coordination transmission refresh period for each IBSS equal to at least a sum of coordination transmission intervals for all IBSSs for (a), or a sum of data burst lengths for all IBSSs for (b).

14. The method of claim 13, wherein the data transmission packet includes a data burst.

15. The method of claim 14, wherein a length of the data burst is less than a target beacon transmission time (TBTT)/N, and wherein N is a number of the IBSSs active on one channel.

16. The method of claim 13, further including setting an arbitration inter-frame space (AIFS) and a contention window (CWIN) of the coordination transmission packet.

17. The method of claim 16, wherein the AIFS=5 and the CWIN=7 relative to a data packet having its AIFS=1 and its CWIN=3.

18. The method of claim 13, wherein the DIFS packets include data packets and/or management packets.

* * * * *